(12) United States Patent
Leite

(10) Patent No.: US 9,152,869 B2
(45) Date of Patent: Oct. 6, 2015

(54) BIOMETRIC AUTHENTICATION SYSTEMS AND METHODS

(71) Applicant: QTech Systems Inc., Hamilton (CA)

(72) Inventor: Nelson Soares Leite, Waterloo (CA)

(73) Assignee: QTech Systems Inc., Hamilton, Ontario ( * ) Notice: Subject to any disclaimer, the term of this patent is extended or adjusted under 35 U.S.C. 154(b) by 97 days.

(21) Appl. No.: 13/777,498

(22) Filed: Feb. 26, 2013

(65) Prior Publication Data

US 2014/0241597 A1    Aug. 28, 2014

(51) Int. Cl.
*G06K 9/00*    (2006.01)

(52) U.S. Cl.
CPC ........ *G06K 9/00979* (2013.01); *G06K 9/00073* (2013.01)

(58) Field of Classification Search
CPC .............. G09K 2009/00006; G07C 9/00158; A61B 5/1172
USPC ......................................................... 382/125
See application file for complete search history.

(56) References Cited

U.S. PATENT DOCUMENTS

| | | | |
|---|---|---|---|
| 6,341,171 B1 | 1/2002 | de Lanauze | |
| 6,836,554 B1 | 12/2004 | Bolle et al. | |
| 7,400,749 B2* | 7/2008 | Hillhouse | 382/124 |
| 7,711,153 B2 | 5/2010 | Hillhouse | |
| 7,916,901 B2 | 3/2011 | Hillhouse | |
| 7,936,905 B2* | 5/2011 | Takahashi et al. | 382/115 |
| 8,135,180 B2 | 3/2012 | Baltatu et al. | |
| 8,417,960 B2* | 4/2013 | Takahashi et al. | 713/186 |
| 8,670,599 B2* | 3/2014 | Lee et al. | 382/124 |
| 2001/0016912 A1* | 8/2001 | Takahashi | 713/200 |
| 2006/0159316 A1* | 7/2006 | Chisamore et al. | 382/125 |

(Continued)

FOREIGN PATENT DOCUMENTS

| | | |
|---|---|---|
| JP | 2007272776 | 10/2007 |
| WO | 2012056582 | 5/2012 |

OTHER PUBLICATIONS

Ulidag, U. Biometric Cryptosystems: Issues and Challenges, Proceedings of the IEEE, vol. 92, No. 6, Jun. 1, 2004, pp. 948-960.

(Continued)

*Primary Examiner* — Samir Ahmed
*Assistant Examiner* — Totam Le
(74) *Attorney, Agent, or Firm* — Bereskin & Parr LLP/S.E.N.C.R.L., s.r.l.

(57) ABSTRACT

Biometric authentication devices, systems and methods are provided. The authentication device includes biometric reader configured for generating raw biometric data indicative of a physiological characteristic of a user; and processor operatively coupled to the biometric reader, the processor being configured for: receiving the raw biometric data, generating derivative biometric data by processing a portion of the raw biometric data relating to a pre-selected aspect of the physiological characteristic, the pre-selected aspect being suitable for identifying the user, the derivative biometric data being indicative of a plurality of instances of the pre-selected aspect in the raw biometric data, generating biometric identification data from the derivative biometric data, the biometric identification data being based upon relationships between the plurality of instances of the pre-selected aspect in the raw biometric data, and using the biometric identification data to identify the user.

22 Claims, 12 Drawing Sheets

(56) References Cited

U.S. PATENT DOCUMENTS

2007/0110288 A1     5/2007    Hillhouse
2008/0072063 A1*   3/2008    Takahashi et al. ............ 713/186

OTHER PUBLICATIONS

Rathgeb, C A survey on biometric cryptosystems and cancelable biometrics, EURASIP Journal on Information Security, No. 3, Sep. 1, 2011, 25 pages.

Ratha, N.K. et al., Generating Cancelable Fingerprint Templates, IEEE Transactions on Pattern Analysis and Machine Intelligence, vol. 29, No. 4, Apr. 1, 2007, pp. 561-572.

Mukesh, R. et al., Fingerprint Based Authentication System Using Threshold Visual Cryptographic Technique, Proceedings of the International Conference on Advances in Engineering, Science and Management, Mar. 30, 2012, pp. 16-19.

Lee, C. et al., Alignment-Free Cancelable Fingerprint Templates Based on Local Minutiae Information, IEEE Transactions on Systems, Man, and Cybernetics—Part B: Cybernetics, vol. 37, No. 4, Aug. 1, 2007, pp. 980-992.

Ang, R. et al., Cancelable Key-Based Fingerprint Templates, Proceedings of the 10th Australasian Conference on Information Security and Privacy, ACISP 2005, Jul. 4, 2005, pp. 242-252.

International Searching Authority, International Search and Written Opinion for PCT/CA2014/000130, mailed on Jul. 4, 2014.

* cited by examiner

○ Intersection point
---- Dividing line

---- Dividing line

BIOMETRIC AUTHENTICATION SYSTEMS AND METHODS

TECHNICAL FIELD

The embodiments herein relate to authentication systems and methods, in particular to authentication systems and methods featuring biometric information.

INTRODUCTION

Biometric authentication generally refers to authenticating a person's identity using the person's biometric data. Biometric data is obtained from the person and may include one or more selected observable physiological characteristics of the person such the person's DNA, finger prints, hand prints, hand geometry, retina information, facial features and so on.

A person's biometric data may be sufficiently unique to the person such that the biometric information could be used to identify the person for authentication purposes. That is, even if the biometric data is not perfectly unique to a person, the statistical probability of having two persons with same biometric data is sufficiently low such that it is possible to authenticate the person based upon the person's biometric data.

As the person's biometric data is generally uniquely related to the person, using biometric information to verify the identity of the person may be more secure than traditional authentication purposes. For example, some credit cards today require the authorized user to provide a personal identification number (PIN) to authenticate transactions. However, it is possible for an unscrupulous actor to obtain the PIN illegally and use the PIN to authorize unsanctioned transactions. Using biometric data derived from the user physiological characteristic such as the user's finger print would make it more difficult for an unauthorized party to replicate the biometric information without the user's participation.

While biometric authorization may be more secure than the existing authentication systems, there are a number of privacy and security concerns associated with using biometric authentication to verify the person's identity. One concern with using biometric information for authentication purposes is the security of the authentication process. For example, if a PIN associated with a user is compromised, it is possible for the user to select a new PIN. However, as biometric data is generated from a person's physiological characteristics, it may be much more difficult (or impossible) to change the biometric information when biometric information is compromised.

There are privacy concerns associated with using biometric information to authenticate everyday transactions. As biometric information is generally unique to each person, a person may not wish to chance having their biometric information compromised by using it for multiple transactions each day. For example, a person may be concerned about an unauthorized actor reproducing the person's fingerprint pattern if the biometric data is compromised.

In addition to privacy and security concerns, biometric authentication systems may also generate a number of false negatives (i.e. erroneously denying authorized users access). False negatives may be attributable to inexact nature of the biometric information that is being generated each time authentication is desired. For example, unlike using a PIN, biometric information may not be identical each time the information is generated due to a variety of factors. For example, a person may not position his/her fingers in the exact same position each time the biometric information is generated. This may cause the biometric information generated to differ from other instances, which could result in false negatives.

There is accordingly a need for a biometric authentication system that addresses at least one of these concerns.

SUMMARY

According to some aspects, there is provided an authentication device including a biometric reader configured for generating raw biometric data indicative of a physiological characteristic of a user, and a processor operatively coupled to the biometric reader. The processor is configured for receiving the raw biometric data, generating derivative biometric data by processing a portion of the raw biometric data relating to a pre-selected aspect of the physiological characteristic, the pre-selected aspect being suitable for identifying the user, the derivative biometric data being indicative of a plurality of instances of the pre-selected aspect in the raw biometric data, generating biometric identification data from the derivative biometric data, the biometric identification data being based upon relationships between the plurality of instances of the pre-selected aspect in the raw biometric data, and using the biometric identification data to identify the user.

The derivative biometric data may include location data for the instances of the pre-selected aspect.

The location data associated with at least some of the instances of the pre-selected aspect may include location points on a two dimensional plane, each of the points being indicative of the location of one of the instances.

The relationships between the plurality of instances of the pre-selected aspect may include relative location of at least one of the location points to at least one other location point.

The processor may be further configured for generating a plurality of triangles from the location points, each of the location points being a vertex of at least one of the triangles, each of the triangles having a position on the plane.

The physiological characteristic may include one of fingerprint, thumbprint and palm print, and the raw biometric data includes an image indicative of the fingerprint, thumbprint and palm print, the fingerprint, thumbprint and palm print having a plurality of friction ridges, wherein at least some of the friction ridges intersect with the other friction ridges.

The pre-selected aspect of the physiological characteristic may include an intersection between the friction ridges.

The processor may be further configured for irreversibly processing the biometric identification data to generate server-side authentication data, the server-side authentication data being different from client-side authentication data and being usable in cooperation with the client-side authentication data for authentication, and providing the server-side authentication data to a server for storage and authentication of subsequently received client-side authentication data.

The processor may be configured to generate the server-side authentication data by dividing biometric identification data into a plurality of subsets, including at least one of the subsets in the server-side authentication data, and excluding at least one of the subsets from the server-side authentication data.

The processor may be further configured for irreversibly processing the biometric identification data to generate client-side authentication data, the client-side authentication data being different from server-side authentication data and being usable in cooperation with the server-side authentication data for authentication, and providing the client-side authentication data to a server for authentication.

The processor may be configured to generate the client-side authentication data by diving biometric identification data into a plurality of subsets, including at least one of the subsets in the client-side authentication data, and excluding at least one of the subsets from the client-side authentication data.

According to some other aspects, there is provided an authentication system including at least one verification device. The verification device includes a first biometric reader configured for generating raw biometric data indicative of a physiological characteristic of a user, and a client-authentication processor coupled to the first biometric reader. The client-authentication processor configured for receiving the raw biometric data, generating derivative biometric data by processing a portion of the raw biometric data relating to a pre-selected aspect of the physiological characteristic, the pre-selected aspect being suitable for identifying the user, the derivative biometric data being indicative of a plurality of instances of the pre-selected aspect in the raw biometric data, generating biometric identification data from the derivative biometric data, the biometric identification data being based upon relationships between the plurality of instances of the pre-selected aspect in the raw biometric data, and irreversibly processing the biometric identification data to generate client-side biometric authentication data, the client-side biometric identification data being different from associated server-side authentication data and being usable in cooperation with the server-side authentication data for authentication. The authentication system also includes a server processor in data communication with the client-authentication processor. The server processor configured for receiving the client-side biometric identification data from the client-authentication processor, obtaining the server-side biometric identification data associated with the user, and authenticating the user based upon the client-side authentication data and the corresponding server-side authentication data.

The system may include least one registration device including a second biometric reader configured for generating second raw biometric data indicative of a physiological characteristic of a user, and a client-registration processor coupled to the second biometric reader. The client-authentication processor configured for receiving the second raw biometric data, generating second derivative biometric data by processing a portion of the second raw biometric data relating to the pre-selected aspect of the physiological characteristic, the second derivative biometric data being indicative of a plurality of instances of the pre-selected aspect in the second raw biometric data, generating second biometric identification data from the second derivative biometric data, the second biometric identification data being based upon relationships between the plurality of instances of the pre-selected aspect in the second raw biometric data, irreversibly processing the second biometric identification data to generate server-side authentication data, the server-side authentication data being different from the client-side authentication data and being usable in cooperation with the client-side authentication data for authentication, and providing the server-side authentication data to a the server processor for storage and authentication of subsequently received client-side authentication data.

The derivative biometric data may include location data for the instances of the pre-selected aspect.

The location data associated with at least some of the instances of the pre-selected aspect may include location points on a two dimensional plane, each of the points being indicative of the location of one of the instances.

The relationships between the plurality of instances of the pre-selected aspect may include relative location of at least one of the location points to at least one other location point.

The client-authentication processor may be further configured for generating a plurality of triangles from the location points, each of the location points being a vertex of at least one of the triangles, each of the triangles having a position on the plane.

The physiological characteristic may include one of fingerprint, thumbprint and palm print, and the raw biometric data includes an image indicative of the fingerprint, thumbprint and palm print, the fingerprint, thumbprint and palm print having a plurality of friction ridges, wherein at least some of the friction ridges intersect with the other friction ridges.

The pre-selected aspect of the physiological characteristic may include an intersection between the friction ridges.

According to some other aspects, there is provided a method for generating server-side authentication data. The method includes receiving raw biometric data from a biometric reader, the raw biometric data being indicative of a physiological characteristic of a user, generating derivative biometric data by processing a portion of the raw biometric data relating to the pre-selected aspect of the physiological characteristic, the derivative biometric data being indicative of a plurality of instances of the pre-selected aspect in the raw biometric data, generating biometric identification data from the derivative biometric data, the biometric identification data being based upon relationships between the plurality of instances of the pre-selected aspect in the raw biometric data, and irreversibly processing the biometric identification data to generate server-side authentication data, the server-side authentication data being different from client-side authentication data and being usable in cooperation with the client-side authentication data for authentication.

According to some other aspects, there is provided a method for generating client-side authentication data. The method includes receiving the raw biometric data, the raw biometric data being indicative of a physiological characteristic of a user, generating derivative biometric data by processing a portion of the raw biometric data relating to a pre-selected aspect of the physiological characteristic, the pre-selected aspect being suitable for identifying the user, the derivative biometric data being indicative of a plurality of instances of the pre-selected aspect in the raw biometric data, generating biometric identification data from the derivative biometric data, the biometric identification data being based upon relationships between the plurality of instances of the pre-selected aspect in the raw biometric data, and irreversibly processing the biometric identification data to generate client-side biometric authentication data, the client-side biometric identification data being different from associated server-side authentication data and being usable in cooperation with the server-side authentication data for authentication.

According some other aspects, there is provided an authentication method. The method includes, receiving client-side biometric authentication data from a client-authentication processor, the client-side biometric identification data being associated with a user, obtaining server-side biometric identification data associated with the user, and processing the client-side authentication data and the corresponding server-side authentication data to authenticate the user.

According to some other aspects, there is provided an authentication device including a biometric reader configured for generating image data indicative of a physiological characteristic of a user, the physiological characteristic being one of a fingerprint, thumbprint and palm print, the fingerprint, thumbprint and palm print having a plurality of friction ridges, and at least some of the friction ridges intersecting with the other friction ridges; and processor operatively coupled to the biometric reader. The processor is configured for receiving the image data, generating derivative biometric data by processing a portion of the image data relating to the intersection of the friction ridges, the intersection of the friction ridges being suitable for identifying the user, the derivative biometric data being indicative of a plurality of points of intersection of the friction ridges identifiable from the image data, generating biometric identification data from the derivative biometric data, the biometric identification data being based upon relationships between the intersection points, and using the biometric identification data to identify the user.

BRIEF DESCRIPTION OF THE DRAWINGS

Some embodiments will now be described, by way of example only, with reference to the following drawings, in which.

DESCRIPTION OF SOME EMBODIMENTS

Figure 1:
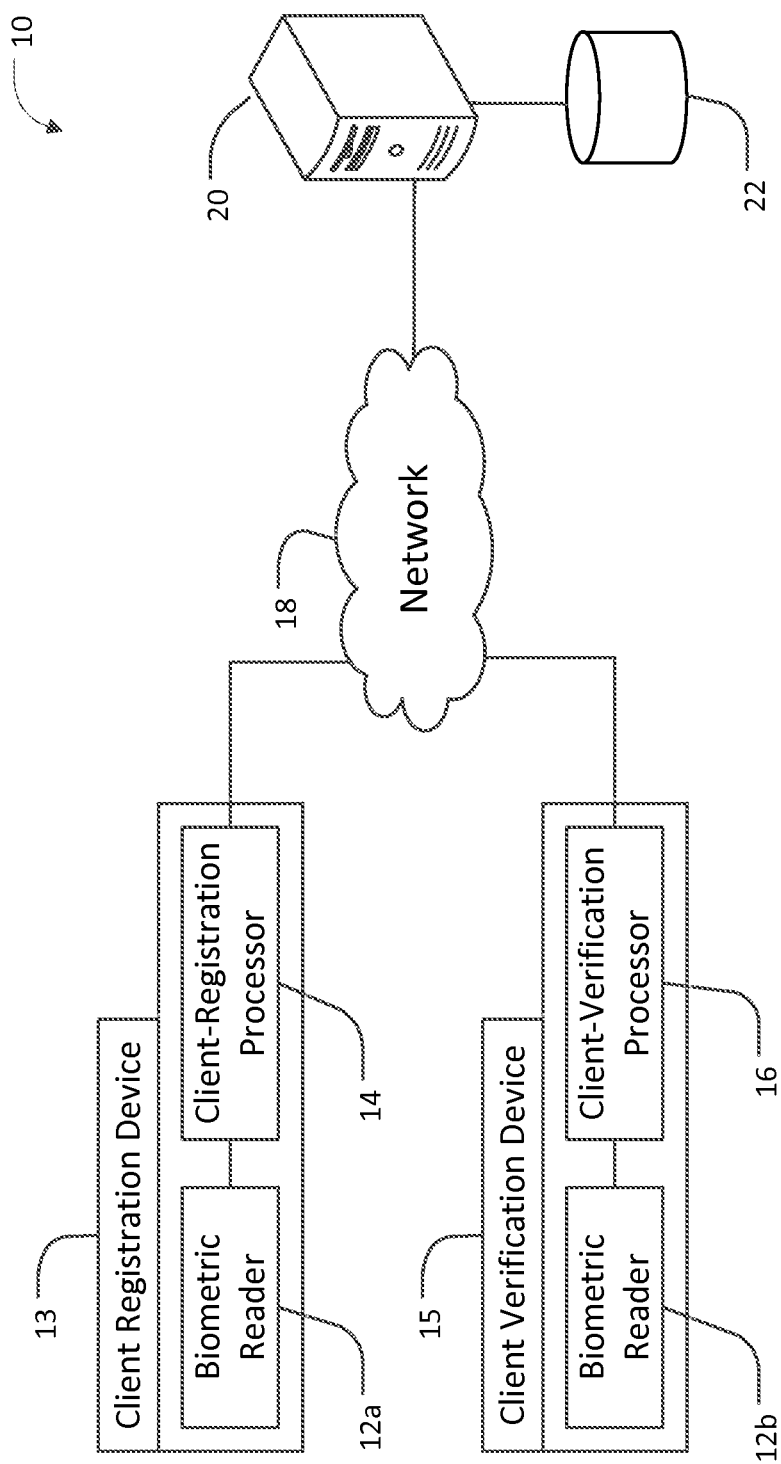
FIG. 1 is a schematic diagram illustrating a biometric authentication system according to some embodiments.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments.

In some cases, the embodiments of the systems and methods described herein may be implemented in hardware or software, or a combination of both. In some cases, embodiments may be implemented in one or more computer programs executing on one or more programmable computing devices comprising at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Referring now to FIG. 1, illustrated therein is a biometric authentication system 10 according to some embodiments. The biometric authentication system 10 will be described herein below in the context of a remote payment system. However, it should be understood that the system 10 may be implemented in any environment where verification of a person's identity based upon the person's biometric information is desirable. For example, the system 10 could be used to grant or deny access to restricted systems. In these cases, some components (e.g. a biometric reader and a verification device) of the system may be provided to one or more users so that they can authenticate themselves remotely to gain access to a system. The system 10 could also be used in other environments, including granting access to physical locations, or authenticating financial transactions that are above a set value in ecommerce settings.

The system 10 could be implemented to complement existing remote payment systems. For example, the system 10 could be used to complement existing credit card or debit card payment systems. For example, the system 10 could leverage existing financial infrastructure to add an additional level of security to existing systems. It is also possible to implement the system 10 selectively by only requiring biometric identification in locations where there are high rates of fraud.

The system 10 according to the embodiment as shown in FIG. 1 includes a client-registration device 13 and a client-verification device 15. The client-registration device 13 includes a biometric reader 12a operatively coupled to the client-registration processor 14. The client-verification device 15 includes a biometric reader 12b operatively coupled to the client-verification processor 16. The client-registration device 13 and the client-verification device 15 are in data communication with the authentication server 20 through a network 18. The network 18, for example, could be a wide area network ("WAN") such as the Internet. The server 20 has access to a data storage device 22 where server-side biometric data required to authenticate various transactions is located.

It should be understood that the biometric reader 12a may be integrated with the client-registration processor 14. That is, a single physical body/housing may include both the biometric reader 12a and the client-verification processor 14. Furthermore, the functions of the biometric reader 12a and the client-verification processor 14 may be performed by the same hardware processor or hardware configuration such that there is no need to externally transfer of data between the biometric reader 12a and the verification device 14. Providing an integrated client-registration device may reduce or eliminate the opportunity for a third party to eavesdrop on the communication between the reader 12a and the processor 14. Similarly, the biometric reader 12b may be integrated with the client-verification processor 16.

Alternatively, the readers 12a and 12b may be provided as stand-alone devices that are in data communication with the processors 14 and 16. For example, the readers 12a and 12b may connect to the client-registration processor 14 and the client-verification processor 16 via a USB connection or any other suitable connection. This may be suitable in circumstances where the chances of the communication between the readers 12a and 12b and the processors 14 and 16 are relatively low. For example, the client-verification processor may be implemented by configuring a processor in a personal computer and connecting the personal computer to the biometric reader 12b.

In some cases, the readers 12a and 12b may be similar or identical such that the readers 12a and 12b are interchangeable with each other. That is, each of the readers 12a and 12b may work with either the registration device 14 or the verification device 16. This may result in cost-savings for the biometric readers through economies of scale as the same reader unit is used for both registration and verification purposes.

Each of the biometric readers 12a and 12b are configured to generate raw biometric data associated with a user. The raw biometric data is indicative of one or more physiological characteristic of the user. The raw biometric data being generated may differ based upon the type of physiological characteristic being captured and they type of the biometric reader 12a and 12b being used.

In the exemplary embodiments described herein, the physiological characteristic includes a print from a user's hand such as a fingerprint (which may include a thumbprint or a palm print). The raw biometric data for such physiological characteristic may include image of the provided fingerprint. Suitable biometric readers 12a and 12b for generating the raw biometric data include finger print scanners or digital cameras configured to capture an image of the user's fingerprint.

In other embodiments, other types of physiological characteristic suitable for identifying users may be used. For example, the physiological characteristic used may include a user's hand, retina, face, voice, a source for DNA and so on. The biometric readers 12a and 12 be in those embodiments may include any suitable device configured to generate raw biometric data from the physiological characteristic being used. The raw biometric data may also differ based upon the physiological characteristic being used. For example, if a user's voice is the physiological characteristic being used, the biometric reader 12a and 12b may include a voice capture device and the generated raw biometric data may include an audio file.

In some embodiments, the raw biometric data may be generated for more than one type of physiological characteristic. For example, the raw biometric data generated may include various combinations of DNA, fingerprints, hand prints, hand geometric, retina scan, voice patterns and the like.

The client-registration device 13 is configured to receive the raw biometric data from the biometric reader 12a and use the data to enroll a user to the system 10 such that the user can subsequently use the system 10 to authenticate one or more financial transactions using the client-verification device 15.

The client-registration device 13 may be located at a secure location where the user's identity could be verified using other means before the user is permitted to register to the system 10. For example, the registration device 14 may be provided at a branch of a bank, and the user's identity is verified by a bank employee before the user is permitted to register.

The client-registration device 13 includes a client-registration processor 14 configured to receive the raw biometric data from the biometric reader 12. The processor 14 is configured to generate derivative biometric data by processing a portion of the raw biometric data relating to a pre-selected aspect of the physiological characteristic and generate biometric identification data from derivative biometric data. The biometric identification is further processed to generate server-side biometric authentication data and the server-side biometric authentication data is provided to the server 20 such that this data could be subsequently used to authenticate the user's identity.

Figure 2:
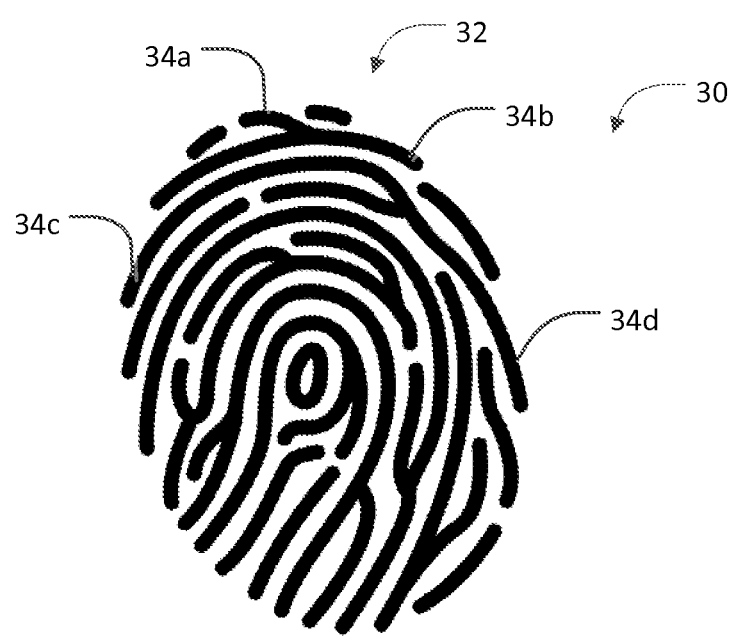
FIG. 2 is a schematic diagram illustrating an image of an exemplary finger/thumb print that may be generated from the biometric readers 12a and/or 12b shown in FIG. 1.

An exemplary method of processing the raw biometric data to generate server-side biometric identification data will now be described with reference to FIGS. 2 to 9. Referring now to FIG. 2, illustrated therein is raw biometric data, which in this example is an image 30 of a fingerprint 32. It should be understood that the fingerprint 32 has been simplified for illustrative purposes. That is, the fingerprint 32 is a simplified version of a real fingerprint for illustrative purposes. A real fingerprint generated from a real finger would contain more lines and the lines may be in different patterns than the fingerprint 32 as shown.

The fingerprint 32 may be generated from any of the user's fingers or thumbs. Generally, if the fingerprint 32 is generated from a particular finger (or thumb), the same finger (or thumb) should be used during subsequent authentication.

The fingerprint 32 includes a number of lines indicative of friction ridges of the user's finger. Four of the lines are indicated using the reference numeral 34 as shown. The friction ridges are generally spiral-shaped. However, the spiral formed by the friction ridges is not a perfect spiral. As opposed to a perfect spiral, which is formed from a single line that does not intersect with itself, the ridge lines on a fingerprint intersect with other ridge lines.

The client-registration processor 14 is configured to derivative biometric data by processing a portion of the raw biometric data relating to a pre-selected aspect of the physiological characteristic. In the exemplary embodiment, the selected aspect of the physiological characteristics includes an intersection between the friction ridges of the user's fingerprint. The instances of the preselected aspect refer to the points on the fingerprint where the friction ridges intersect each other. The client-registration processor 14 is also configured to generate biometric identification data from the derivative biometric data as described in herein below. The biometric identification data is generated based upon relationships between the plurality of instances of the pre-selected aspect in the raw biometric data.

Figure 3:
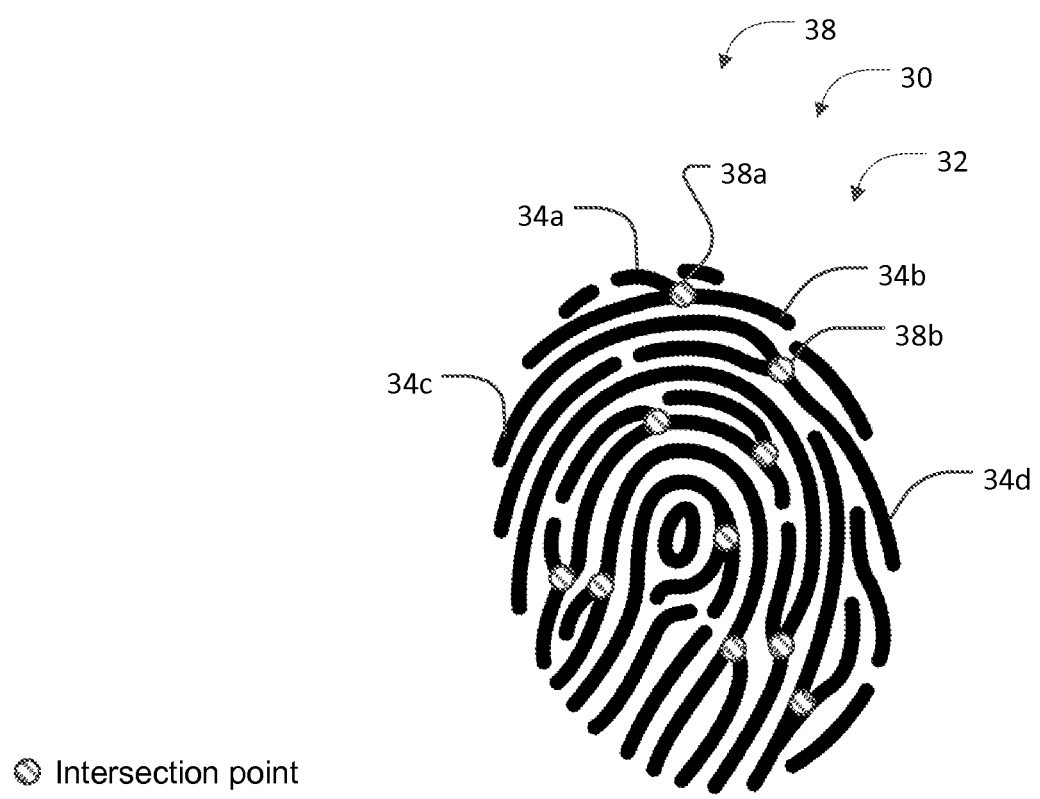
FIG. 3 is a schematic diagram illustrating a number of data points that may be generated on the image shown in FIG. 2.

Referring now to FIG. 3, illustrated therein is a number of intersection points 38. As shown for example, point 38a is located at the intersection between the lines 34a and 34b, and point 38b is located at the intersection between the lines 34c and 34d.

In the current example, there are ten points 38 of intersection that can be detected from the finger print 32. It should be understood that in fingerprints other than the fingerprint 32, the number of detectable points of intersection may vary. For example, a real fingerprint may have tens or hundreds of intersection points.

Each of the intersection points 38 has location data associated therewith. For example, the points 38 may be mapped on a two-dimensional (2D) plane such as the x-y graph shown in FIG. 4. The location of each intersection point may be recorded relative to the x-axis and the y-axis and each point could be represented using the x and y coordinates.

The client-registration processor 14 is also configured to determine the relationships between the points 38. To determine the relationship between the points 38, the processor may be configured to generate a plurality of triangles from the location points 38 where each of the points 38 serves as a vertex of for one or more triangles. That is, a number of triangles are generated with the points 38 being at the vertices of the triangles. The location and the position of the triangles may also be recorded on the same 2D plane.

There is more than one suitable way to generate the triangles form a set of points serving as vertices. Generally, given a set of points 38, it is possible to generate triangles therefrom by connecting one of the points 38 to two other points 38. Generating triangles for the points 38 in a plane can be viewed as a triangulation of the convex hull of the points 38, with all points 38 being among the vertices of the triangulation. Various suitable algorithms could be used to generate triangles from the points 38. For example, the Delaunay triangulation could be applied to the points 38 to generate a number of triangles therefrom. In another example, triangles could be generated from the points 38 by connecting each point to two other nearest points 38. In other examples, any other suitable triangulation algorithms may be employed to generate a number of triangles from the set of points 38 provided that these triangles are not generated randomly. That is, given a same set of points, a same set of triangles are generated.

In some embodiments, triangles may be generated joining each point to any other two points that are not in a single line. Generally, this method would result in a larger number of triangles being generated the methods described hereinabove as the generated triangles may overlap each other. For example, given nine points (points 40A-40I), and no three points are on a line, then the number generated triangles would be equal to "9 choose 3" (n choose k) or 84 triangles, which is substantially larger than 10 triangles generated in the example shown. This may be desirable as this would provide a richer data set to work from.

Figure 4:
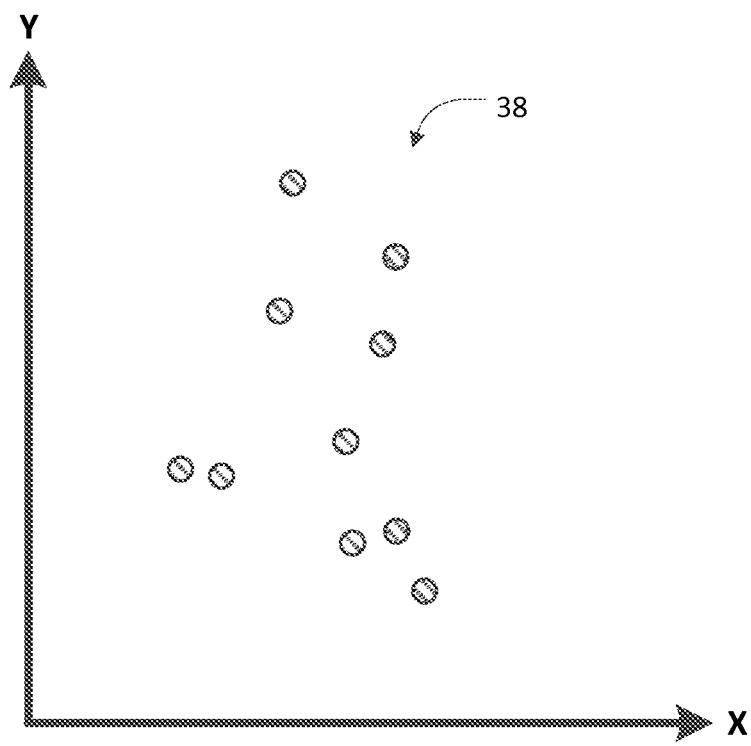
FIG. 4 is a schematic diagram illustrating a number of data points shown in FIG. 3 mapped on a graph having a X axis and a Y axis.
Figure 5:
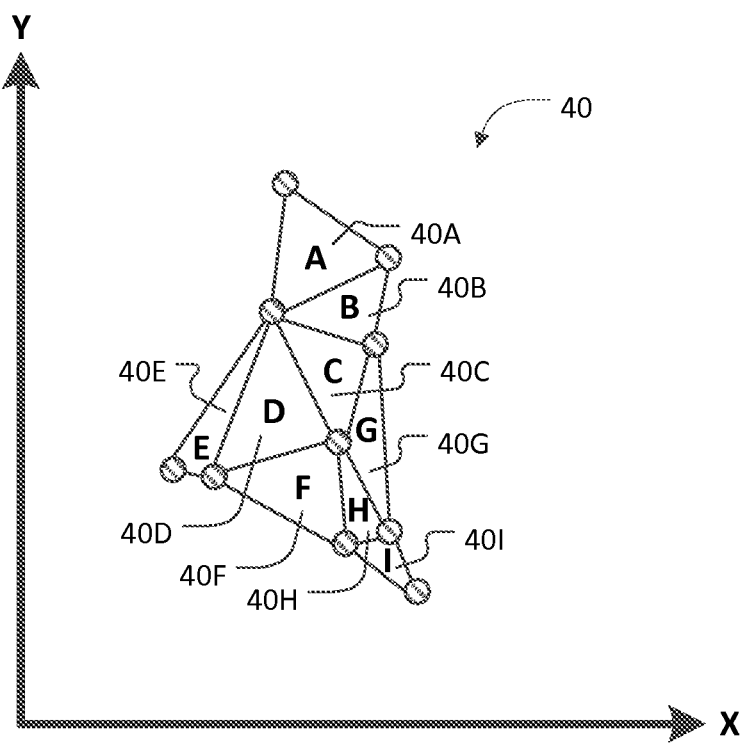
FIG. 5 is a schematic diagram illustrating a number of triangles that can be generated from the points shown in FIG. 4.
Figure 6:
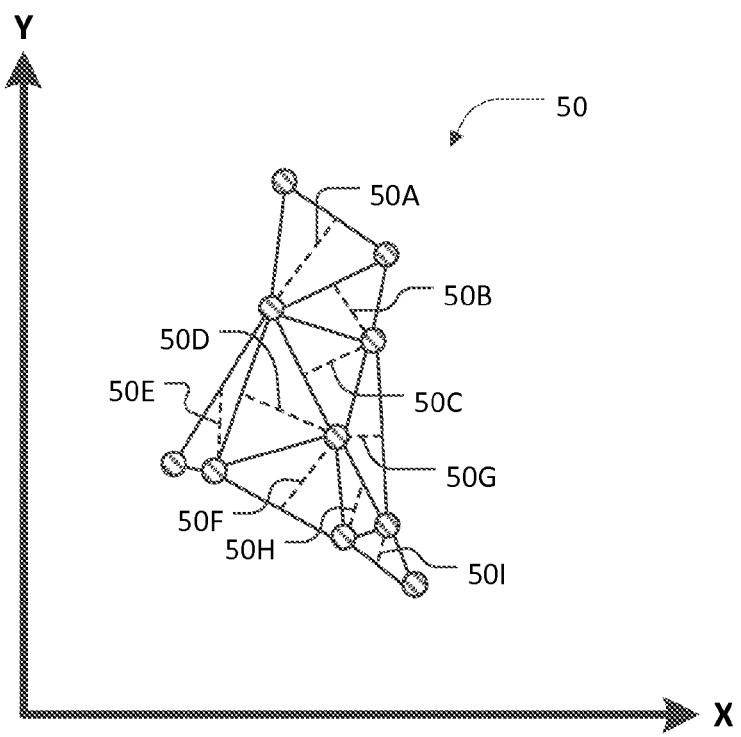
FIG. 6 is a schematic diagram illustrating a number of dividing lines generated for the triangles shown in FIG. 5.

Referring now to FIG. 5, illustrated therein is a number of exemplary triangles 40 generated from the points 38 shown in FIG. 4. The triangles 40, indicated by reference characters "A" to "I" are generated by connecting one of the points 38 with two other points 38. The triangles are in a tessellation (i.e. the triangles do not overlap). It should be understood that in other embodiments, depending on the algorithm being used to generate the triangles, the configuration and the number of the triangles may be different than the triangles 40.

After the triangles 40 are generated, an orientation of each of the triangles 40 is determined. As shown, the orientation is obtained by defining a line that divides the triangle into two portions (i.e. two smaller triangles). This can be accomplished, for example, by determining the longest length of each of the triangles 40 and defining a line that extends from the midway point of the longest length to the remaining vertex (i.e. the vertex of the triangle that is not a vertex of the longest length). This dividing line is illustrated using stippled lines in FIG. 6. In the example as shown, each of the lines 50A to 50I defines the orientation of the triangles. In other embodiments, other suitable means to determine the orientation of the triangles may be employed.

The orientation of each of the triangles relative to other triangles is then recorded. This may be accomplished by noting the angles of the dividing line for each of the triangles relative to the angle of the dividing lines from other triangles.

Figure 7:
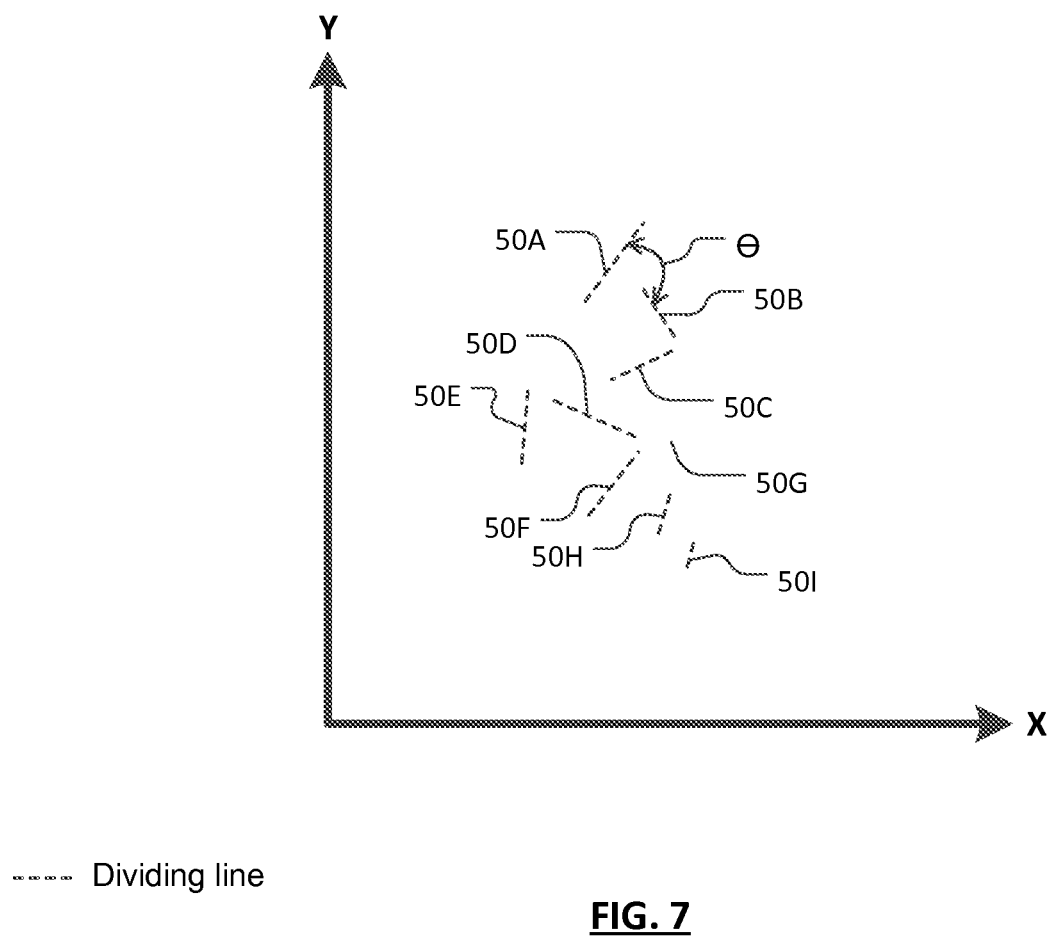
FIG. 7 is a schematic diagram illustrating the dividing lines shown in FIG. 6.

Referring now to FIG. 7, illustrated therein are the dividing lines 50A to 50I associated with the triangles A-I. For example, the angle θ between bisecting line 50A and 50B (e.g. 100 degrees) is recorded. Similarly, the angles between line 50A and each of lines 50C to 50I are also recorded. This process may be repeated for the remaining lines 50B to 50I. For example, information about the angles between the line 50B and other lines may be obtained and recorded. Similarly, information about the angles between the line 50C and other lines may be obtained and recorded. This process may be repeated for lines 50D, 50E, 50F, 50G, 50H and 50I. After completing the process, the orientation of the bisecting line for each triangle relative to other bisecting lines is recorded. By extension, the orientation of each triangle relative to other triangles is also recorded.

Figure 8:
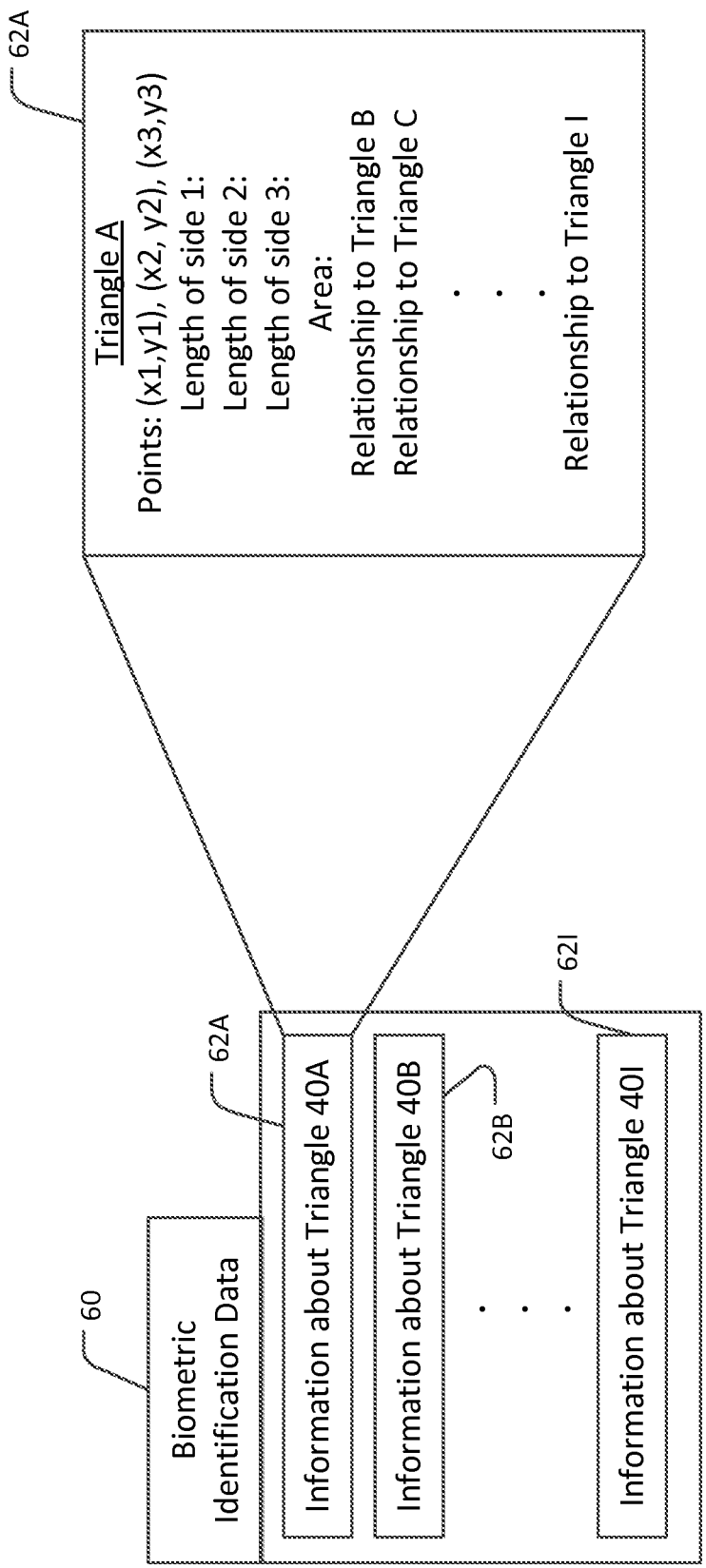
FIG. 8 is a schematic diagram illustrating contents of the exemplary biometric data that may be generated by the processors 14 and 16 shown in FIG. 1.

Referring now to FIG. 8, illustrated therein is exemplary biometric identification data 60 that may be generated by the processor from the raw biometric data. As shown, the exemplary biometric identification data may include information 62A-62I about each of the triangles 40A-40I. In other embodiments, the biometric identification data may include additional information, less information or other suitable information than the information described herein.

In the example as shown, the information about triangle 40A, indicated by reference numeral 62A, may include the location of the points that make up each triangle. The information 62A may include the length of the sides of each triangle. The information 62A may include the area of each triangle. The information 62A may include the orientation of the triangle, which in the example above is determined using a dividing line.

The information 62A may also include the relationship between the orientation of the triangle 40A to other triangles 40B-40I. As described in the example provided above, the relationship is noted by recording the orientation of each of the bisecting lines 50 to other bisecting lines.

Generating various data points and triangles from the user's physiological characteristic and noting the relationship between various points and triangles may be advantageous in that it may reduce the number of false negatives in the authentication system. Generally, raw biometric data generated from a person's physiological characteristics may not be identical each time the data is generated. For example, the user may not place the fingers in the exact same position each time the image of the fingerprint is generated. In some cases, the pressure or the orientation of the fingers may be different, which may change the raw biometric data that is generated. By generating various data points and the triangles generated from those points, the relationship between the points and the triangles may remain intact despite the variations in the raw biometric data that is being generated.

It should be understood that the process of generating biometric identification data from the raw biometric data is irreversible. That is, it is not possible to regenerate the raw biometric data from the identification data as the identification data does not store information necessary to regenerate the raw biometric data. For example, it is not possible to regenerate the image 30 of the finger print based upon the biometric identification data 60. The biometric identification data 60 includes information about the intersection points and the location of the points relative to each other. However, it does not include information about specific information of the friction ridges such as the length, shape or pattern of the ridges. As the biometric identification data 60 does not include information necessary to recreate the fingerprint, it could be said that the process of generating biometric identification data 60 from the raw biometric data is irreversible. Using irreversible data may be advantageous in that if the biometric identification data is misappropriated, the biometric identification data cannot be used to recreate a copy of the user's physiological characteristic. This may assuage privacy and security concerns associated with using biometric data for identification.

In some embodiments, to add another layer of security, the biometric identification may be irreversibly processed before transmission to the server 20 as described herein below.

While the method of generating biometric identification data 60 described hereinabove reference to FIGS. 2-8 is described as being implemented by the client-registration processor 14, the same steps are also implemented by the client verification processor 16. That is, the client-verification processor is configured to generate derivative biometric data by processing a portion of the raw biometric data relating to a pre-selected aspect of the physiological characteristic. The derivative biometric data is indicative of a plurality of instances of the pre-selected aspect in the raw biometric data. As described hereinabove, the pre-selected aspect includes the intersection of the friction ridges and the instances of the pre-selected aspect include the specific points of intersection on the fingerprint. The client processor is also configured to generate biometric identification data from the derivative biometric data, the biometric identification data being based upon relationships between the plurality of instances of the pre-selected aspect in the raw biometric data.

However, the client-registration processor 14 and the client verification processor 16 differ from each other by how they process the generated biometric identification data 60.

Figure 9:
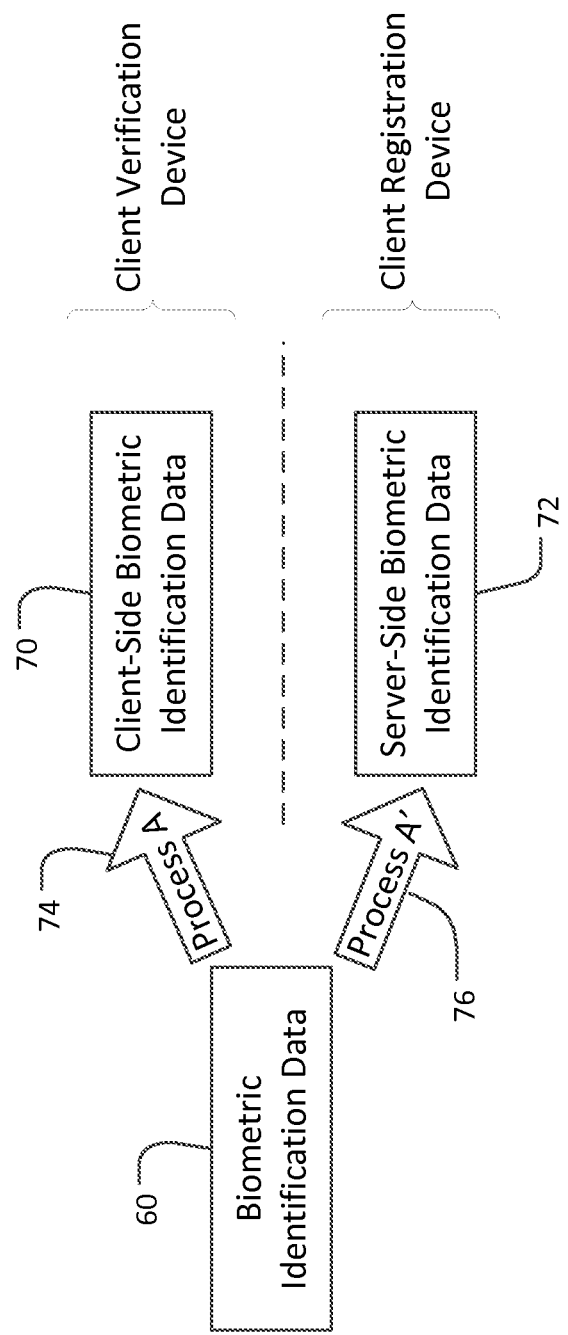
FIG. 9 is a schematic diagram illustrating client-side biometric identification data and server-side biometric authentication data being generated from the biometric identification data shown in FIG. 8.

Referring now to FIG. 9, the client registration processor 14 is configured to irreversibly process the biometric identification data 60 to generate server-side biometric identification data 72. For example, if the user is being registered such that he can use his biometric information in subsequent verifications, the server-side biometric identification data 72 is generated using the client-registration device 13.

The client verification processor 16, in contrast, is configured to irreversibly process the biometric identification data 60 to generate client-side biometric identification data 70. The client-side biometric identification data 70 may be generated when the user has already been registered and he/she is trying to very his identity using the client verification device 15.

Generally, the client-side biometric identification data 70 and the server-side biometric identification data 72 cooperate to verify the user's identity and provide necessary authentication. That is, the client-side biometric authentication data 70 and the server-side biometric authentication data could be processed to ascertain that both data 70 and 72 had been generated from the same user, thereby verifying the identity of the user.

The process of generating client-side biometric identification data 70 and/or the server-side biometric identification data 72 may be irreversible. That is, if either of the client-side biometric identification data 70 or the server-side biometric identification data 72 is compromised, it is not possible to regenerate the biometric identification data 60 from either set of data alone. That is, it is not possible to recover the biometric identification data 60 from the client-side biometric identification data 70 alone. Similarly, it is not possible to recover the biometric identification data 60 from the server-side biometric authentication data 70 alone. For example, even if the communication between the client-verification server 15 and the server 20 is compromised, and the client-side biometric identification data 70 is obtained by unauthorized personnel, it is not possible to recreate the biometric identification data 60 from that information. Similarly, if the server-side biometric identification data 72 is compromised, it is not possible to recreate the biometric identification data from that information.

The process of generating the data 70 and 72 may be configured such that the server-side biometric data 70 cannot be determined from client-side biometric data 72, and vice versa (i.e. the client-side biometric data 72 cannot be determined from server-side biometric data 70). The client-side biometric data 72 and server-side biometric data 70 can be said to be asymmetric in that these data 70 and 72 are not identical.

Using asymmetric identification data could be distinguished, for example, from shared-key or shared-knowledge authentication systems such as password/pin systems. In these systems, authentication is achieved by determining whether a password or a pin provided by a client-side device matches the password or the pin stored in the server. In contrast, the server-side biometric data is not symmetrical (i.e. the same as) the client-side biometric data. The client-side biometric data and the server-side biometric data are asymmetrical yet complementary such that the server-side biometric data could be used to authenticate the client-side biometric data.

The biometric identification data 60 could be processed using any suitable means to generate the server-side and client-side biometric identification data 70 and 72 that have the above noted properties. Referring now to FIG. 9, illustrated is client-side biometric identification data 70 and the server-side biometric identification data 72 generated from the biometric identification data 60. In the example as shown, a first process (i.e. process A) as indicated by reference numeral 74 is applied to the biometric identification data 60 to generate client-side biometric identification data 70. A second process (i.e. process A') indicated by reference numeral 76 is applied to the biometric identification data 60 to generate server-side biometric identification data 72.

The processes A and A' are related in that, given the same input (e.g. the biometric identification data 60), the respective outputs (e.g. server-side biometric identification data 72 and client-side biometric identification data 74) cooperates to authenticate each other.

In some embodiments, the process A could be a hash function using first set variables specified using a certain method and the process A' could be a hash function using a second set of variables using the method. The variables may then be transmitted to the server along with other authentication information.

Referring back to FIG. 8, an exemplary suitable way to process the biometric identification data 60 could include storing data about selected triangles as client-side biometric authentication data 70 and the data about the remaining triangles as server-side biometric authentication data 72. For example, data on every other triangle (i.e. triangles A, C, E, G, I) could be stored as client-side biometric authentication data

70 and the data on the remaining triangles (i.e. triangles B, D, F, H) could be stored as server-side biometric authentication data 72.

In another example, the biometric identification data 60 could be processed by storing the data about some of the points as client-side biometric authentication data 70 and the data about the remaining points as server-side biometric authentication data 72.

To provide an additional layer of security, the processing of the biometric-data 60 to the server-identification data 70 and client-side biometric authentication data 72 may be executed by a processor that is integrated within the client-registration device 13 or the client-verification device 15 respectively. For example, the same processor that generates the raw biometric data may be used to generate the client-side and server-side biometric identification data.

In some embodiments, the processors 14 and/or 16 may be configured to delete the client identification data once the client-side biometric authentication data 70 or the server-side biometric authentication data 72 is generated. This may reduce the chances of compromising the client identification data 60.

In some embodiments, the registration device 13 and the verification device 15 may be the same device operating in two modes. For example, a device provided within a bank branch may be configured to function as a registration device 14 and a verification device 16 depending on a mode of operation selected. However, the device provided to the retailers may be limited to function only as the verification device 16.

Referring back to FIG. 1, the server 20 has a processor in data communication with the client-authentication processor and the client-registration processor 14. The server processor is configured to receive the server-side biometric identification data 72 from the client registration processor 14. The received data is stored in the data storage device 22 such that it could be used to receive subsequently received client-side biometric data 70.

The server 20 is also configured to receive the client-side biometric authentication data 70 from the client-verification processor 16. Along with the client-side biometric authentication data 70, the server 20 may receive other information related to the user and/or the transaction such as the user's financial card number, merchant identification and the amount to debit the user's account. The server obtains the server-side biometric authentication data 72 associated with the user, and authenticate by processing the client-side biometric authentication data 70 and the server-side biometric authentication data 72.

In some cases, authentication using the biometric authentication data 70 and 72 may occur in addition to existing authentication methods to provide an added layer of protection. In other cases, the authentication may replace one or more existing authentication methods.

Figure 10:
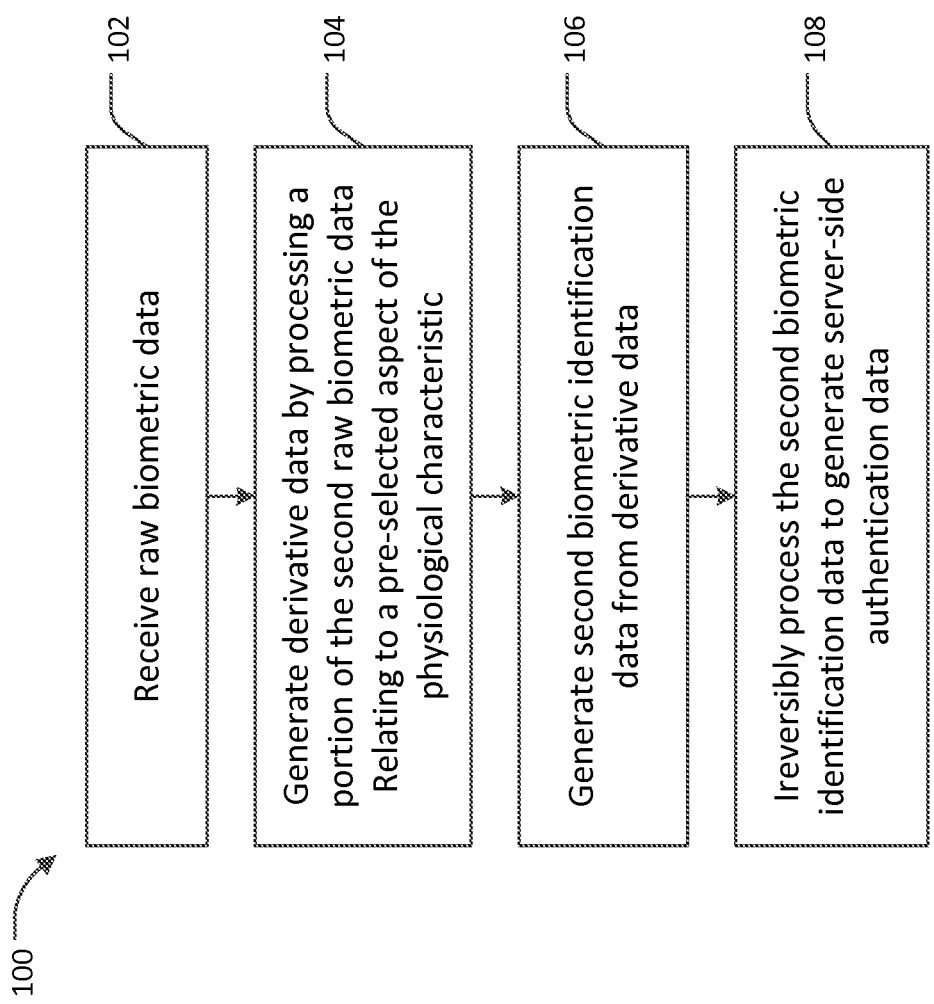
FIG. 10 is a method that may be executed by the client registration device shown in FIG. 1 for generating server-side biometric authentication data according to some embodiments.

An exemplary use case will now be described with reference to FIGS. 10 and 11. Referring now to FIG. 10, illustrated therein is an authentication method 100. The method 100 may be used by one or more users to register their biometric data for subsequent authentication. The method may be implemented, for example, by the client-registration processor 14 of the system 10 shown in FIG. 1 and described herein above. The method 100 begins at step 102.

At step 102, first raw biometric data from at least one biometric reader is received. The first raw biometric data, for example, may be an image of a user's finger/thumb print.

At step 104, derivative biometric data is generated by processing a portion of the raw biometric data relating to a pre-selected aspect of the physiological characteristic. The derivative biometric data is indicative of a plurality of instances of the pre-selected aspect in the raw biometric data. The pre-selected aspect, for example may include intersection of the friction ridges and the step of process in the image may include identifying instances where the friction ridges intersects each other within the image and noting the location of the intersection points.

At step 106, biometric identification data is generated from derivative biometric data. The biometric identification data is generated based upon relationships between the plurality of instances of the pre-selected aspect. For example, the biometric identification data may be generated by applying a selected algorithm to the intersection points to generate a number of triangles, determining the orientation of the triangles, and including information about the intersection points, the triangles and the orientation of the triangles in the biometric identification data. This step is described in further detail herein above with reference to the system 10 and FIGS. 2-8.

At step 108, the biometric identification data generated in step 106 is irreversibly processed to generate server-side biometric authentication data that can be used to authenticate client-side biometric authentication data.

The server-side biometric authentication data may then be provided to a server for storage and subsequent authentication.

Figure 11:
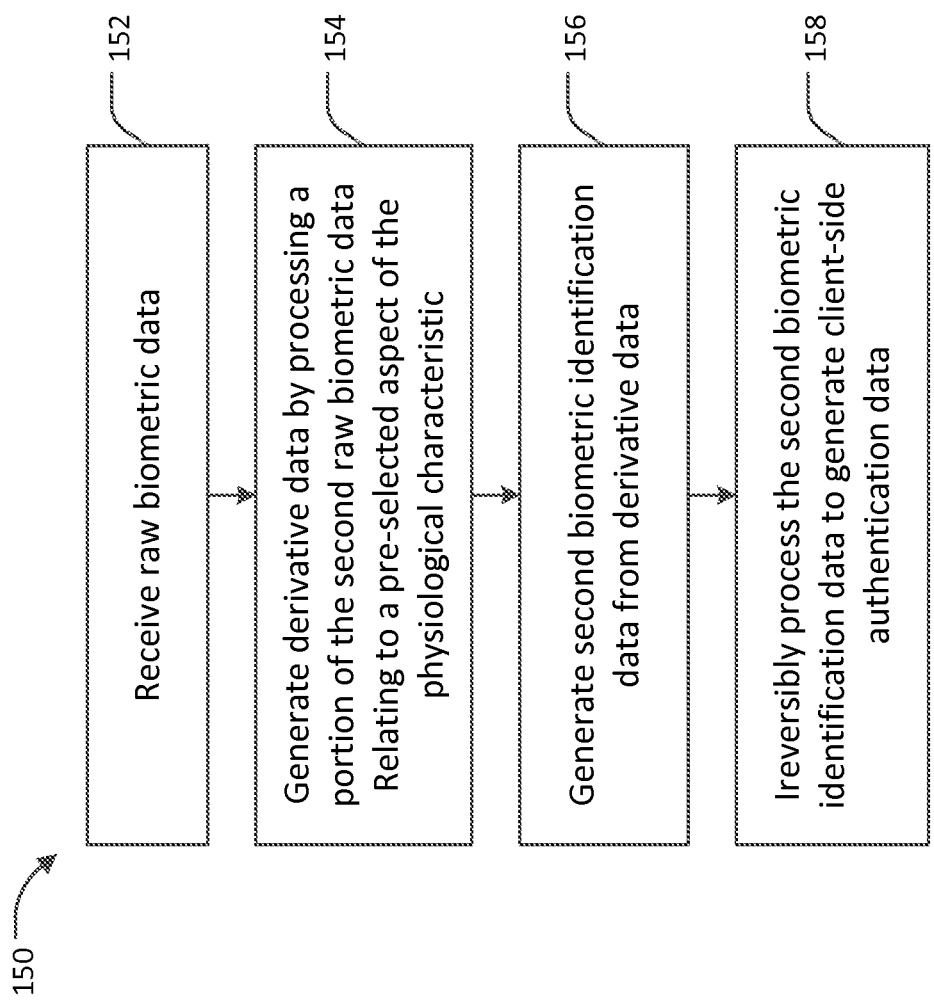
FIG. 11 is a method that may be executed by the client verification device shown in FIG. 1 for generating client-side biometric authentication data according to some embodiments.

Referring now to FIG. 11, illustrated therein is an authentication method 150, which may be used by a user to self-identify to receive authorization and/or authentication. Before being able to execute the method 150 successfully, the user would need to register with the system, for example, by executing the method 100 described above.

The method 150, for example, may be implemented by the client-verification device 15 of the system 10 described herein above. The method 150 begins at step 152.

At step 152, raw biometric data from at least one biometric reader is received. The first raw biometric data, for example, may be an image of a user's finger/thumb print. This step is similar to step 102.

At step 154, derivative biometric data is generated by processing a portion of the raw biometric data relating to a pre-selected aspect of the physiological characteristic. The derivative biometric data is indicative of a plurality of instances of the pre-selected aspect in the raw biometric data. The pre-selected aspect, for example may include intersection of the friction ridges and the step of process in the image may include identifying instances where the friction ridges intersects each other within the image and noting the location of the intersection points. This step is similar to step 104.

At step 156, biometric identification data is generated from derivative biometric data. The biometric identification data is generated based upon relationships between the plurality of instances of the pre-selected aspect. For example, the biometric identification data may be generated by applying a selected algorithm to the intersection points to generate a number of triangles, determining the orientation of the triangles, and including information about the intersection points, the triangles and the orientation of the triangles in the biometric identification data. This step is described in further detail herein above with reference to the system 10 and FIGS. 2-8. This step is similar to step 106.

At step 158, the biometric identification data generated in step 106 is irreversibly processed to generate client-side biometric authentication data. The client-side biometric authentication data cooperates with previously generated server-side biometric authentication data associated with the user to identify the user and authorize the user.

The client-side biometric authentication data may then be provided to a server for authentication.

Figure 12:
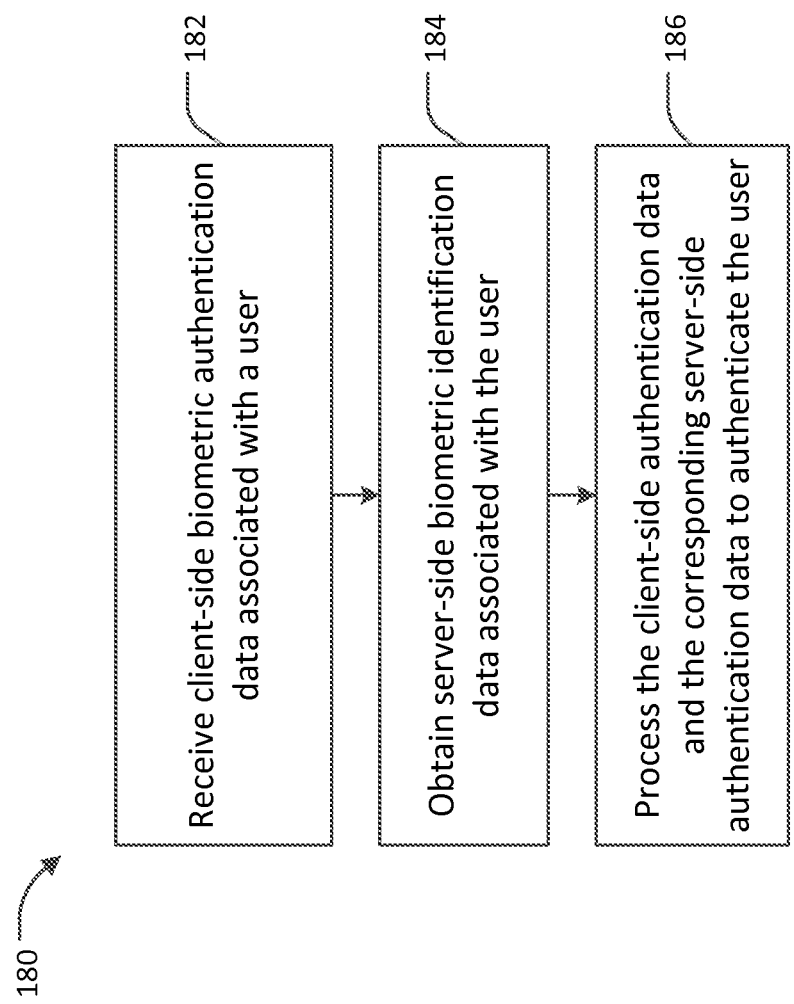
FIG. 12 is a method that may be executed by the server shown in FIG. 1 for authenticating a user based upon client-side biometric authentication data and server-side biometric authentication data according to some embodiments.

Referring now to FIG. 12, illustrated therein is a method 180 for authenticating a user. The method 180 may be implemented by the server 20. The method 180 begins at step 182.

At step 182, client-side biometric authentication data associated with a user is received from the client-authentication processor.

At step 184, server-side biometric authentication data associated with the user is obtained. The server-side biometric authentication data may had been previously generated by the user, for example by using the client registration device 13 shown in FIG. 1 and described above.

At step 186, the client-side biometric authentication data and the server-side biometric identification data are processed to authenticate the user.

While the above description provides examples of one or more apparatus, systems and methods, it will be appreciated that other apparatus, systems and methods may be within the scope of the present description as interpreted by one of skill in the art.

The invention claimed is:

1. An authentication device comprising:
   (a) a biometric reader configured for generating raw biometric data indicative of a physiological characteristic of a user; and
   (b) a processor operatively coupled to the biometric reader, the processor being configured for:
      (i) receiving the raw biometric data,
      (ii) generating location points on a plane by processing a portion of the raw biometric data relating to a pre-selected aspect of the physiological characteristic, the pre-selected aspect being suitable for identifying the user, the location points being indicative of a plurality of instances of the pre-selected aspect in the raw biometric data,
      (iii) generating a plurality of triangles from the location points, each of the location points being a vertex of at least one of the triangles,
      (iv) obtaining an orientation of each of the triangles by defining a dividing line that divides each of the triangles into two portions,
      (v) generating derivative biometric data based on the orientation,
      (vi) generating biometric identification data from the derivative biometric data, the biometric identification data being based upon relationships between the plurality of instances of the pre-selected aspect in the raw biometric data, and
      (vii) using the biometric identification data to identify the user.

2. The device of claim 1, wherein the physiological characteristic comprises one of fingerprint, thumbprint and palm print, and the raw biometric data includes an image indicative of the fingerprint, thumbprint and palm print, the fingerprint, thumbprint and palm print having a plurality of friction ridges, wherein at least some of the friction ridges intersect with the other friction ridges.

3. The device of claim 2, wherein the pre-selected aspect of the physiological characteristic comprises an intersection between the friction ridges.

4. The device of claim 1, wherein the processor is further configured for:
   (a) irreversibly processing the biometric identification data to generate server-side authentication data, the server-side authentication data being different from client-side authentication data and being usable in cooperation with the client-side authentication data for authentication; and
   (b) providing the server-side authentication data to a server for storage and authentication of subsequently received client-side authentication data.

5. The device of claim 4, wherein the processor is configured to generate the server-side authentication data by:
   (a) dividing biometric identification data into a plurality of subsets;
   (b) including at least one of the subsets in the server-side authentication data; and
   (c) excluding at least one of the subsets from the server-side authentication data.

6. The device of claim 1, wherein the processor is further configured for:
   (a) irreversibly processing the biometric identification data to generate client-side authentication data, the client-side authentication data being different from server-side authentication data and being usable in cooperation with the server-side authentication data for authentication; and
   (b) providing the client-side authentication data to a server for authentication.

7. The device of claim 6, wherein the processor is configured to generate the client-side authentication data by:
   (a) diving biometric identification data into a plurality of subsets;
   (b) including at least one of the subsets in the client-side authentication data; and
   (c) excluding at least one of the subsets from the client-side authentication data.

8. The device of claim 1, wherein the obtaining the orientation of each triangle further comprises determining an angle of each dividing line relative to the other dividing lines.

9. An authentication system comprising:
   (a) at least one verification device including:
      (i) a first biometric reader configured for generating raw biometric data indicative of a physiological characteristic of a user; and
      (ii) a client-authentication processor coupled to the first biometric reader, the client-authentication processor configured for:
         (1) receiving the raw biometric data,
         (2) generating location points on a plane by processing a portion of the raw biometric data relating to a pre-selected aspect of the physiological characteristic, the pre-selected aspect being suitable for identifying the user, the location points being indicative of a plurality of instances of the pre-selected aspect in the raw biometric data,
         (3) generating a plurality of triangles from the location points, each of the location points being a vertex of at least one of the triangles,
         (4) obtaining an orientation of each of the triangles by defining a dividing line that divides each of the triangles into two portions,
         (5) generating derivative biometric data based on the orientation,
         (6) generating biometric identification data from the derivative biometric data, the biometric identification data being based upon relationships between the plurality of instances of the pre-selected aspect in the raw biometric data, and
         (7) irreversibly processing the biometric identification data to generate client-side biometric authentication data, the client-side biometric identification data being different from associated server-side authentication data and being usable in cooperation with the server-side authentication data for authentication; and
(b) a server processor in data communication with the client authentication processor, the server processor configured for:
   (i) receiving the client-side biometric identification data from the client-authentication processor,
   (ii) obtaining the server-side biometric identification data associated with the user, and
   (iii) authenticating the user based upon the client-side authentication data and the corresponding server-side authentication data.

10. The system of claim 9, further comprising at least one registration device including:
(a) a second biometric reader configured for generating second raw biometric data indicative of a physiological characteristic of a user; and
(b) a client-registration processor coupled to the second biometric reader, the client-authentication processor configured for:
   (i) receiving the second raw biometric data,
   (ii) generating second location points on a plane by processing a portion of the second raw biometric data relating to the pre-selected aspect of the physiological characteristic, the second location points being indicative of a plurality of instances of the pre-selected aspect in the second raw biometric data,
   (iii) generating a plurality of second triangles from the second location points, each of the second location points being a vertex of at least one of the second triangles,
   (iv) obtaining an orientation of each of the second triangles by defining a second dividing line that divides each of the second triangles into two portions,
   (v) generating second derivative biometric data based on the orientation of each of the second triangles,
   (vi) generating second biometric identification data from the second derivative biometric data, the second biometric identification data being based upon relationships between the plurality of instances of the pre-selected aspect in the second raw biometric data,
   (vii) irreversibly processing the second biometric identification data to generate server-side authentication data, the server-side authentication data being different from the client-side authentication data and being usable in cooperation with the client-side authentication data for authentication, and
   (viii) providing the server-side authentication data to a the server processor for storage and authentication of subsequently received client-side authentication data.

11. The system of claim 10, wherein the obtaining the orientation of each second triangle further comprises determining a second angle of each second dividing line relative to the other second dividing lines.

12. The system of claim 9, wherein the physiological characteristic comprises one of fingerprint, thumbprint and palm print, and the raw biometric data includes an image indicative of the fingerprint, thumbprint and palm print, the fingerprint, thumbprint and palm print having a plurality of friction ridges, wherein at least some of the friction ridges intersect with the other friction ridges.

13. The system of claim 12, wherein the pre-selected aspect of the physiological characteristic comprises an intersection between the friction ridges.

14. The system of claim 9, wherein the obtaining the orientation of each triangle further comprises determining an angle of each dividing line relative to the other dividing lines.

15. A method for generating server-side authentication data, the method comprising:
(a) receiving raw biometric data from a biometric reader, the raw biometric data being indicative of a physiological characteristic of a user;
(b) generating derivative location points on a plane by processing a portion of the raw biometric data relating to the pre-selected aspect of the physiological characteristic, the location points being indicative of a plurality of instances of the pre-selected aspect in the raw biometric data;
(c) generating a plurality of triangles from the location points, each of the location points being a vertex of at least one of the triangles,
(d) obtaining an orientation of each of the triangles by defining a dividing line that divides each of the triangles into two portions,
(e) generating derivative biometric data based on the orientation,
(f) generating biometric identification data from the derivative biometric data, the biometric identification data being based upon relationships between the plurality of instances of the pre-selected aspect in the raw biometric data; and
(g) irreversibly processing the biometric identification data to generate server-side authentication data, the server-side authentication data being different from client-side authentication data and being usable in cooperation with the client-side authentication data for authentication.

16. The method of claim 15, wherein the obtaining the orientation of each triangle further comprises determining an angle of each dividing line relative to the other dividing lines.

17. A method fort generating client-side authentication data, the method comprising:
(a) receiving raw biometric data, the raw biometric data being indicative of a physiological characteristic of a user;
(b) generating location points by processing a portion of the raw biometric data relating to a pre-selected aspect of the physiological characteristic, the pre-selected aspect being suitable for identifying the user, the location points being indicative of a plurality of instances of the pre-selected aspect in the raw biometric data;
(c) generating a plurality of triangles from the location points, each of the location points being a vertex of at least one of the triangles,
(d) obtaining an orientation of each of the triangles by defining a dividing line that divides each of the triangles into two portions,
(e) generating derivative biometric data based on the orientation,
(f) generating biometric identification data from the derivative biometric data, the biometric identification data being based upon relationships between the plurality of instances of the pre-selected aspect in the raw biometric data; and
(g) irreversibly processing the biometric identification data to generate client-side biometric authentication data, the client-side biometric identification data being different from associated server-side authentication data and being usable in cooperation with the server-side authentication data for authentication.

18. The method of claim 17, wherein the obtaining the orientation of each triangle further comprises determining an angle of each dividing line relative to the other dividing lines.

19. An authentication method, the method comprising:
  (a) receiving client-side biometric authentication data from a client-authentication processor, the client-side biometric identification data being associated with a user and comprising a plurality of first triangles indicative of raw biometric data pertaining to the user, and an orientation of each of the plurality of first triangles, each orientation determined by dividing each of the plurality of first triangles into two portion and defining a first dividing line therebetween;
  (b) obtaining server-side biometric, identification data associated with the user and comprising a plurality of second triangles and an orientation of each of the plurality of second triangles, each orientation determined by dividing each of the second triangles into to portions and defining a second dividing line therebetween; and
  (c) processing the client-side authentication data and the corresponding server-side authentication data to authenticate the user by comparing the orientation of each of the plurality of first triangles with the orientation of each of the plurality of second triangles.

20. The method of claim 19, wherein the orientation of each of the plurality of first triangles is further defined by angles relative to each of the first dividing lines and the other first dividing lines, and the orientation of each of the plurality of second triangles is further defined by angles relative to each of the second diving lines and the other second dividing lines.

21. An authentication device comprising:
  (a) a biometric reader configured for generating image data indicative of a physiological characteristic of a user, the physiological characteristic being one of a fingerprint, thumbprint and palm print, the fingerprint, thumbprint and palm print having a plurality of friction ridges, and at least some of the friction ridges intersecting with the other friction ridges; and
  (b) a processor of coupled to the biometric reader, the processor being configured for:
    (i) receiving the image data,
    (ii) generating location points on a plane by processing a portion of the image data relating to the intersection of the friction ridges, the intersection of the friction ridges being suitable for identifying the user, the location points being indicative of a plurality of points of intersection of the friction ridges identifiable from the image data,
    (iii) generating a plurality of triangles from the location points, each of the location points being a vertex of at least one of the triangles,
    (iv) obtaining an orientation of each of the triangles by defining a dividing line that divides each of the triangles into two portions,
    (v) generating derivative biometric data based on the orientation,
    (vi) generating biometric identification data from the derivative biometric data, the biometric identification data being based upon relationships between the intersection points, and
    (vii) using the biometric identification data to identify the user.

22. The device of claim 21, wherein the obtaining the orientation of each triangle further comprises determining an angle of each dividing line relative to the other dividing lines.

* * * * *